Dec. 5, 1939.  A. F. SCHAEFFER  2,181,979
AMUSEMENT DEVICE
Filed June 1, 1938  2 Sheets-Sheet 1
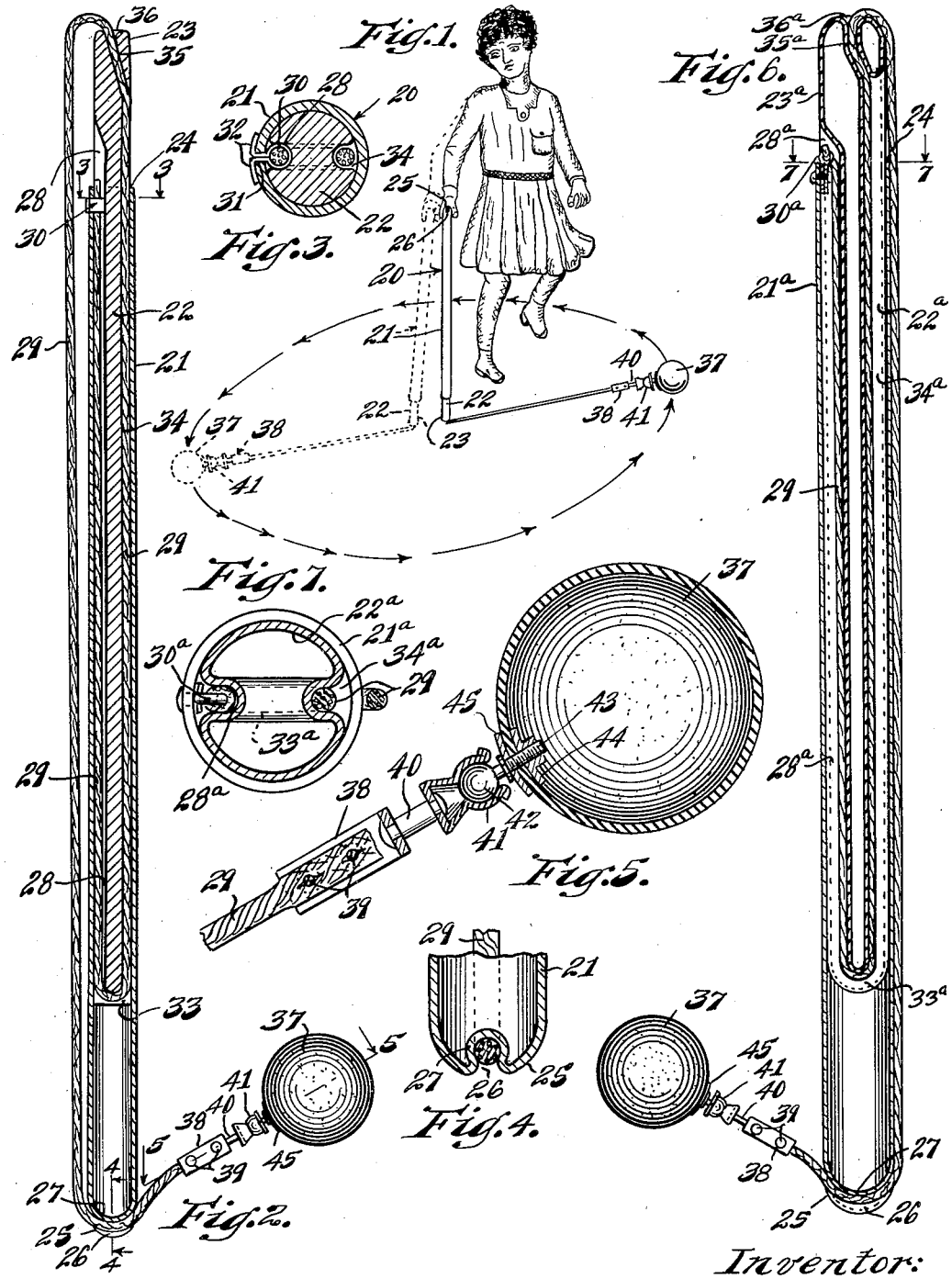
Inventor:
Albert F. Schaeffer,
By Joshua R. H. Potts
his Attorney.

Dec. 5, 1939.  A. F. SCHAEFFER  2,181,979
AMUSEMENT DEVICE
Filed June 1, 1938  2 Sheets-Sheet 2
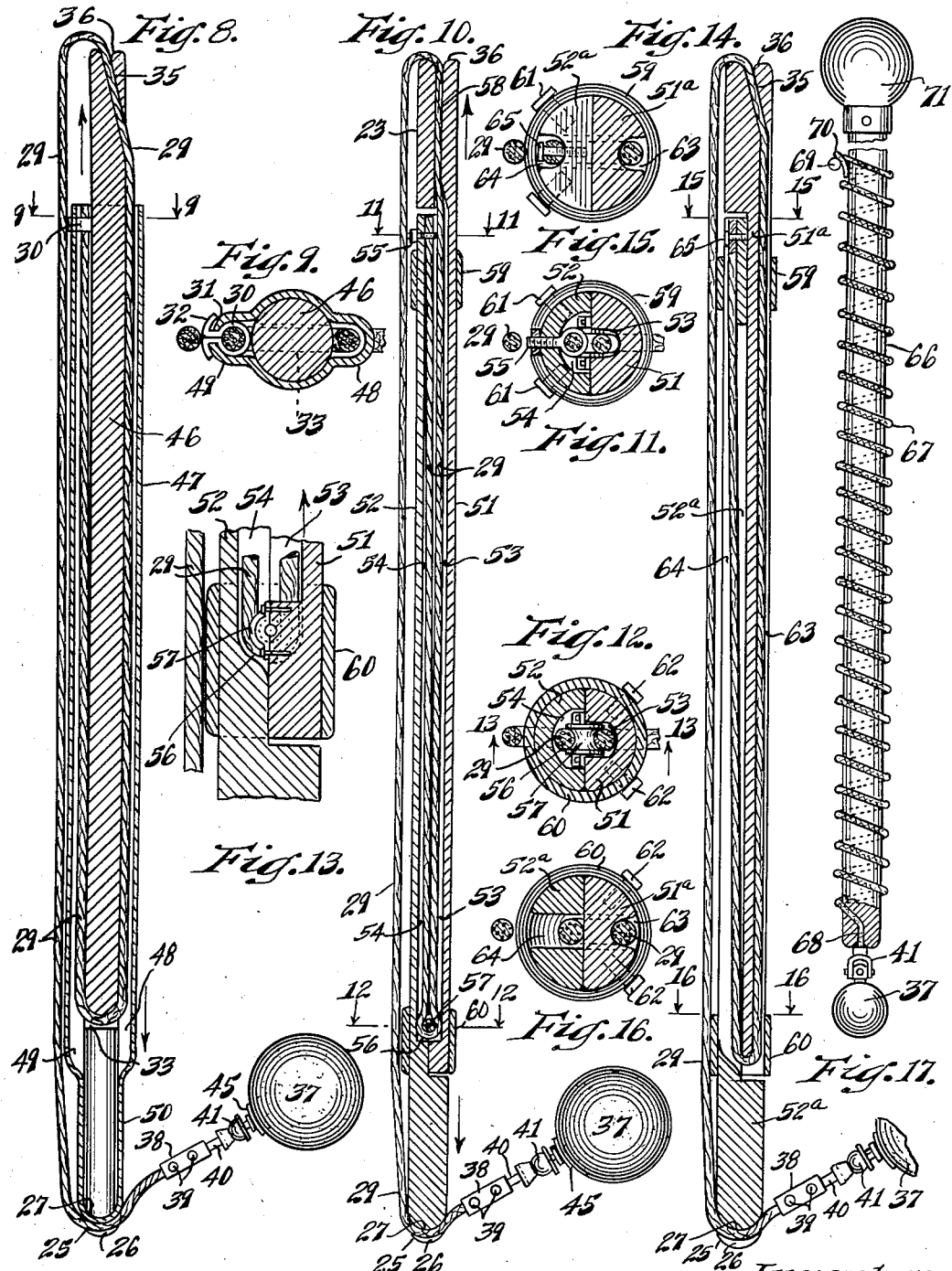
Inventor:
Albert F. Schaeffer,
By Joshua R. H. Potts
his Attorney.

Patented Dec. 5, 1939

2,181,979

UNITED STATES PATENT OFFICE 2,181,979

AMUSEMENT DEVICE

Albert F. Schaeffer, Homewood, Ill., assignor of one-half to Edward J. Barry, Chicago, Ill.

Application June 1, 1938, Serial No. 211,266

12 Claims. (Cl. 272—75)

This invention relates to an amusement device and more particularly to a device which embodies an extensible handle or stick and a rope carried thereby and extensible with reference thereto to provide a skipping or jumping rope for one or more persons.

An object of the invention is to provide a novel amusement device in which a person holding the handle in a substantially vertical position causes it to be swung in a circular path to cause the rope which extends at right angles to its lower end to travel in a circle so that the person swinging the same may jump or skip over the rope as it passes in either direction according to the direction in which it is operated, and in which by extending the handle and end of the rope will permit the person operating the device to revolve the same in the path of a number of persons all of whom will skip or jump over the rope as it passes, thus providing an attractive, simple and inexpensive device for amusement, skill and exercise.

Other objects and advantages will appear and be brought out more fully in the following specification, reference being had to the accompanying drawings wherein:

Fig. 1 is a perspective view disclosing the manner of use of the device by one person;

Fig. 2 is a central longitudinal sectional view thereof;

Fig. 3 is an enlarged transverse sectional view taken on the line 3—3 of Fig. 2;

Fig. 4 is an enlarged fragmentary sectional view taken longitudinally on the line 4—4 of Fig. 2;

Fig. 5 is an enlarged fragmentary sectional view taken on the line 5—5 of Fig. 2;

Fig. 6 is a longitudinal sectional view similar to Fig. 2 of a modified construction;

Fig. 7 is an enlarged cross-sectional view taken on the line 7—7 of Fig. 6;

Fig. 8 is a view similar to Figs. 2 and 6 of a further modification;

Fig. 9 is an enlarged cross-section taken on the line 9—9 of Fig. 8;

Fig. 10 is a longitudinal section of another modification;

Fig. 11 is an enlarged cross-section taken on the line 11—11 of Fig. 10;

Fig. 12 is a view similar to Fig. 11 taken on the line 12—12 of Fig. 10;

Fig. 13 is a section at right angles to Fig. 12 taken on the line 13—13 thereof;

Fig. 14 is a longitudinal section of a still further modification;

Fig. 15 is an enlarged section on the line 15—15 of Fig. 14;

Fig. 16 is an enlarged section taken on the line 16—16 of Fig. 14; and

Fig. 17 is an elevation, partly in section, of still another modification.

Referring to the drawings, the amusement device is shown as embodying an elongated handle or stick 20 which is extensible in length. As shown in Figs. 1 to 5 inclusive, it is made up of an outer tubular section 21 in which a section 22 is extensibly fitted or telescoped with one end 23 thereof normally projecting from the end 24 of the tubular section 21. This end of the tubular section is left free and open and the opposite end may be open or closed. It is shown closed or confined as indicated at 25 and provided with a recess 26 running diametrically with a restricted entrance portion, the metal being pressed in as indicated at 27 to form a groove at the rounded end of the tubular section.

The section 22, which may be of wood or other suitable material has a groove 28 extending along one side at a spaced distance from the extremity at the end 23 and in line with the axis of said section. This groove is sufficiently deep to accommodate a rope 29 which has one end anchored within the adjacent end of the tubular section 21 as indicated at 30. This anchoring means is shown in the form of a clip or split clamp having a tubular portion receiving the rope and the ends passed through an opening 31 in the wall of the tubular section and clinched as indicated at 32, but it is to be understood that any suitable anchoring or clamping means may be provided for this purpose. After extending along the groove 28 to the opposite end of the section 22, the rope 29 is extended around a guideway 33 shown in the form of a groove continuing with the groove 28 and a similar groove 34 extends along the diametrically opposite side of the section 22 parallel therewith and with the axis of the section. At a point spaced from the extremity of the end 23, the rope is extended diagonally through an opening 35 to the free end of said section and merges in a flared portion 36. The rope is then of sufficient length to extend beyond the opposite end of the tubular section and when the device is not in use or is packed for storage or shipment, the rope may be held in the groove or seat 27. It is simply snapped through the restricted entrance portion and held frictionally. A ball or spherical weighted body, preferably a hollow rubber ball 37 is swiveled on the free end of the rope so that it may turn as it strikes the ground when swung or whirled in a circular path as shown in Fig. 1 of the drawings to prevent the rope twisting or entangling. Preferably this swivel connection is made by means of a U-shaped clamp 38 fastened as at 39 to the free end of the rope and carrying a swiveled pin 40 which is in turn swiveled to the ball. This may be effected by connecting the pin 40 to the socket 41 of a ball and socket joint consisting of the ball 42 having a stem 43 threaded or otherwise connected to inner and outer plates 44 and 45 inserted through a hole in the wall of the ball and clamped by the threaded engagement of the stem therewith. By this construction the ball can swing angularly and also turn on its own axis as it revolves about the handle when in use. It will also be seen that by moving the sections of the handle relatively, the same may be extended or shortened in length and as the handle is extended in length, the rope, due to the fact that the grooved end 33 moves toward the open end 24 of the tubular section, may also be extended in length to an extent equal to the distance that the anchored end 30 of the rope moves along the groove 29 as the open end of the tube approaches the grooved end 33 of the section 22. By so doing, the length of rope extending from the lower end of the handle and particularly the end 23 of the section 22 will be increased and by swinging the device in the same manner the rope may be caused to pass by several persons other than the one operating the device, all of whom will jump or skip over the rope at the proper time, thus providing amusement and exercise for a number of people.

When it is desired to shorten or collapse the device from the extended position previously described the sections of the handle are moved on one another in the opposite direction. This relative movement will cause the anchored end 30 at the end 24 of the tubular section to move toward the closed end of the groove 28 and as it does the rope will travel through the passage 35 and along the groove 34 at the opposite side of the section 22, over the grooved end 33 and thus shorten the projected end of the rope, after which the same may be anchored adjacent the ball as previously described.

In Figs. 6 and 7 of the drawings a modification of the structure shown in Figs. 1 to 6 inclusive, is illustrated in which the tubular section 21a corresponds to the section 21 and instead of the solid section 22, a tubular section 22a is provided. This tubular section 22a is formed with opposed grooves 28a and 34a pressed from the metal longitudinally of the tubular section composing the same. The end 23a closes one end of the groove 28a and a tubular passage 35a extends at an angle to the end of the section 22a at the axis thereof and is flared to prevent injury to the rope as indicated at 36a in the same manner as previously described. The end of the rope which is anchored to the section 21a is shown held in a clamp 30a as disclosed at the upper end of Fig. 6 where this clamp is illustrated as embodying a strip with a tubular portion receiving the rope and a bolt passed through apertures in the rebent ends of the strip and the wall of the tubular section to clamp the parts in position but any other suitable means may be provided for this purpose. Otherwise the construction is the same as disclosed and shown in connection with the previous form.

In Figs. 8 and 9 of the drawings another modified form of construction is illustrated in which instead of forming the one section corresponding to the sections 22 and 22a with external grooves, a section 46 is provided which may be solid or a tube but in which the grooves are omitted. The tubular section 47 is projected at diametrically opposite sides to form ribs 48 and 49 producing internal grooves for accommodating the rope in rebent form in the same manner as previously described. Otherwise the construction is the same but one end of the tubular section 47 may be reduced in diameter as indicated at 50 by eliminating the ribs 48 and 49 at this point where the handle is grasped by the user. The extension and restriction of the rope and lengthening or shortening of the handle is effected in the same manner.

In Figs. 10 to 13 inclusive, a further modification is shown in which the handle is made up of two semicircular sections 51 and 52 placed facewise against one another and provided with grooves 53 and 54 in the co-acting faces for accommodating the rope one end of which is anchored as at 55 and doubled on itself as indicated at 56 within the two sections, at which point it may be passed around a pulley or roller 57 journaled at the end of the groove 53 in the other section and then passed out through the axial passage 58 at the end of said section. The two sections are held together by bands 59 and 60 at the opposite overlapping ends of the sections, the band 59 being secured to the section 52 as indicated at 61 and the band 60 being anchored to the section 51 as indicated at 62 by means of pins, screws or otherwise. While the two sections of the rope where the same is rebent or folded on itself are close together, still the operation and use of the device are the same as in the other forms.

In Figs. 14 to 16 inclusive of the drawings another construction is shown in which the sections 51a and 52a are employed but instead of having the grooves along the co-acting flat inner faces of the sections, the grooves are formed at the outside as indicated at 63 and 64 to accommodate the rope in the same manner as described in connection with Figs. 1 to 7 inclusive. The anchoring means for one end of the rope may be as shown at 65, being a screw passed through the terminal end of the rope and into the wall of the section 52a. Bands are used to hold the sections together the same as in the forms shown in Figs. 10 to 13 inclusive which are anchored in the same manner.

In the form of the invention shown in Fig. 17 the handle 66 has the rope coiled thereon as at 67 to be extended through the passage 68 carrying the spherical weight or ball so that the extended end may be drawn up to the swiveled connection with said body or ball or extended any desired length. The other end of the rope may be provided with an enlarged terminal 69 held in a notched anchoring member 70 and the grasping end of the stick may be provided with a head 71. By coiling the rope around the handle any desired number of turns, a longer or shorter length of rope at the free end of the handle may be provided. The swivel connection at the ball will prevent the tangling of the rope and the ball from spinning with the rope inasmuch as the ball may revolve as it touches the ground. The use of this form is the same as the forms previously described, except as to the extension feature which has been pointed out.

I claim:

1. An amusement device of the class described comprising an extensible handle, a rope carried by the handle and adapted to be drawn into or extended therefrom by the shortening or lengthening of the handle, and a terminal on the free end of the rope.

2. An amusement and exercising device of the class described comprising an elongated handle formed in sections, said sections being disposed in overlapping relation extensible one with respect to the other to shorten and lengthen the handle, a rope anchored to one section doubled on itself to project from one end of one section and adapted to be extended at different distances therefrom, and a weighted member at the free end of the rope.

3. An amusement and exercising device of the class described comprising an elongated handle formed in sections, said sections being extensible one with respect to the other to shorten and lengthen the handle, a rope anchored to one section and bent upon itself over said section and movable along the same as the sections are shifted relatively in either direction, said rope being extensible at different lengths from the end of said section, and a ball having a swiveled and universal joint connection with the extended end of the rope.

4. An amusement and exercising device comprising a handle in the form of a staff comprising two sections telescoping one on the other, a rope movable in a groove in one of said sections and anchored at one end to the end of one section, said rope being doubled on itself and extended through the end of the other section projecting therefrom, a ball swiveled to the extended end of the rope, and retaining means for holding the rope against the section adjacent the ball.

5. A rope skipping device comprising an extensible stick, an extensible rope so carried thereby and extensible therewith by the extension of the stick to a degree greater than the extension of the stick and a ball mounted on the free end of the rope.

6. A rope skipping device comprising an extensible stick, an extensible rope carried thereby and extensible therewith, said rope being adapted to be retracted upon retraction of the stick and a ball mounted to revolve on the free end of the rope.

7. A rope skipping device comprising an extensible stick comprising telescoping sections with the end of one section normally projecting from the other and movable relatively in opposite directions, a rope extensibly mounted on the stick and adapted to project from one end at different lengths by the extension or retraction of the stick, and a swiveled ball at the free end of the rope.

8. An amusement device of the class described comprising a handle, a rope tortuously wound with respect to the major portion thereof and passing through one end only of the handle and extensibly mounted with respect to the handle and a ball on the free end of the rope, said handle having a gripping portion at one end beyond the tortuously wound portion of the rope.

9. An amusement device of the class described comprising an elongated rectilinear handle, a rope passing through one end only of the handle and extensibly mounted with respect to the handle by movement thereon relative thereto, and a ball secured to the free end of the rope, and means for anchoring the opposite end of the rope to the handle.

10. An amusement device of the class described comprising a handle, the rope passing only through one end of the handle and extensibly mounted on the greater portion of the length thereof in tortuous form, said handle having a gripping portion beyond the rope and a ball on the free end of the rope.

11. A rope skipping device comprising an extensible stick comprising telescoping sections movable relatively in opposite directions, a rope extensibly mounted on the stick and adapted to move on the end of one section over which it extends and to project from one end at different lengths by the extension or retraction of the stick, the end of one section normally projecting from the other, and a ball at the free end of the rope.

12. An amusement device of the class described comprising an elongated rectilinear handle, a rope passing through one end only of the handle and extensibly mounted with respect to the handle by movement thereon relative thereto, and a ball secured to the free end of the rope, means for anchoring the opposite end of the rope to the handle, and means for anchoring the ball end of the rope to the handle.

ALBERT F. SCHAEFFER.